(12) United States Patent
Brunner

(10) Patent No.: US 9,891,076 B2
(45) Date of Patent: Feb. 13, 2018

(54) METHOD AND ANGLE SENSOR FOR CONTACTLESS MEASUREMENT OF AN ANGLE

(71) Applicant: Schaeffler Technologies AG & Co. KG, Herzogenaurach (DE)

(72) Inventor: Siegfried Brunner, Ottendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 3 days.

(21) Appl. No.: 14/773,587

(22) PCT Filed: Dec. 11, 2013

(86) PCT No.: PCT/DE2013/200353
§ 371 (c)(1),
(2) Date: Sep. 8, 2015

(87) PCT Pub. No.: WO2014/146628
PCT Pub. Date: Sep. 25, 2014

(65) Prior Publication Data
US 2016/0025519 A1    Jan. 28, 2016

(30) Foreign Application Priority Data

Mar. 20, 2013 (DE) .................. 10 2013 204 871

(51) Int. Cl.
*G01B 7/30* (2006.01)
*G01D 5/20* (2006.01)

(52) U.S. Cl.
CPC .................. *G01D 5/2046* (2013.01)

(58) Field of Classification Search
CPC ............ G01R 31/1272; G01R 31/1281; G01R 31/08; G01R 31/1254; G01D 5/2046
USPC .................. 324/207.15, 200, 207.11, 207.13
See application file for complete search history.

(56) References Cited

U.S. PATENT DOCUMENTS

| 5,446,966 A * | 9/1995 | Ishizaki | H02K 24/00 318/605 |
| 6,087,751 A * | 7/2000 | Sakai | H02K 1/246 310/156.56 |
| 6,554,303 B2 * | 4/2003 | Benz | B60R 21/01 180/446 |

(Continued)

FOREIGN PATENT DOCUMENTS

| DE | 10156238 | 6/2003 |
| DE | 102006007668 | 8/2007 |

(Continued)

*Primary Examiner* — Minh N Tang
(74) *Attorney, Agent, or Firm* — Volpe and Koenig, P.C.

(57) ABSTRACT

A method and an angle sensor for contactless measurement of an angle between a first machine element and a second machine element rotatable with respect thereto. A plurality of coils are non-rotatably connected to the first machine element and include transmitter coils—distributed around the rotational axis. Each of the transmitter coils is arranged in a sector about the rotational axis. An iron-core element non-rotatably connected to the second machine element is disposed in a sector opposite the transmitter coils. Based on applying voltage pulses, a determination of the angle to be measured is effected starting from a ratio formation between the amplitude of a secondary voltage pulse associated with a selected transmitter coil and a peak amplitude.

11 Claims, 1 Drawing Sheet

(56) References Cited

U.S. PATENT DOCUMENTS

| | | | | |
|---|---|---|---|---|
| 6,651,999 B1* | 11/2003 | Fischer | ............... | B62D 15/02 180/400 |
| 2011/0006758 A1* | 1/2011 | Mitterreiter | ............ | F16C 19/38 324/207.2 |
| 2013/0134967 A1* | 5/2013 | Kaufmann | ............. | H02P 6/185 324/207.25 |

FOREIGN PATENT DOCUMENTS

| | | |
|---|---|---|
| DE | 102008012922 | 9/2009 |
| DE | 19946934 | 9/2011 |
| WO | 9849519 | 11/1998 |

\* cited by examiner

METHOD AND ANGLE SENSOR FOR CONTACTLESS MEASUREMENT OF AN ANGLE

BACKGROUND

The present invention relates to a method for the contactless measurement of an angle between a first machine element and a second machine element that can rotate relative to the first machine element. The method can be used, for example, for measuring angles in the automotive industry. The invention further relates to an angle sensor for measuring an angle.

DE 10 2008 012 922 A1 shows an inductive angle sensor with a stator in planar arrangement and a rotor, wherein an exciter element and at least one receiver element are arranged on the stator. The rotor comprises a circular conductor, wherein vanes in the form of circular ring segments are formed on the outer circumference of this conductor.

From DE 101 56 238 A1, an inductive angle sensor is known for a motor vehicle in which an exciter coil is inductively coupled with multiple receiver coils by means of moving inductive coupling elements. The coupling elements are each formed as a conductor loop with a periodic geometry.

DE 199 46 934 A1 shows a module for use in a motor vehicle that is provided for measuring an angle, for contactless energy transmission, and for contactless information transfer. The module comprises a stator-side component with a primary coil and a rotor-side component with a short-circuited secondary coil for determining the angle position.

SUMMARY

Starting with the prior art, the objective of the present invention is to increase the accuracy in the inductive measurement of angles and to reduce the power consumption required for increasing the accuracy, for example, for uses in the automotive industry. In addition, the robustness against external influences, for example, increased temperature or magnetic fields that have effects from the outside, is to be improved.

The specified objective is achieved by a method according to the invention and also by an angle sensor according to the invention.

The method according to the invention is used for measuring an angle between a first machine element and a second machine element that can rotate about a rotational axis relative to the first machine element. This can involve machine elements that can be rotated an arbitrary number of revolutions relative to each other or machine elements that can be rotated only a limited amount, for example, by only a quarter revolution relative to each other. The rotatable second machine element can be, for example, an adjusting device, so that the position of the adjusting device can be measured with the method according to the invention. The method according to the invention is preferably used in the automotive industry.

Several coils are locked rotationally with the first machine element. The coils are preferably connected rigidly to the first machine element. The coils comprise at least five transmitter coils that are distributed about the rotational axis. Each of the transmitter coils is arranged in a sector about the rotational axis. The sectors of the coils are arranged coaxial to the rotational axis. An iron core element is rotationally locked with the second machine element. The iron core element is preferably rigidly connected to the second machine element. The iron core element is opposite the transmitter coils in the form of a sector about the rotational axis. Thus, the transmitter coils arranged in the sectors and the sector-shaped iron core element are opposite each other. The sector of the iron core element is likewise arranged coaxial to the rotational axis. The sector of the iron core element has a greater central angle than the individual sectors of the transmitter coils. Preferably, the sector of the iron core element has a central angle that is at least twice as large as the central angle of the individual sectors of the transmitter coils. Because the iron core element does not have an effect around the entire circumference about the rotational axis, it covers only one part of the transmitter coils that are distributed about the rotational axis. In each angle position, at least one of the transmitter coils is completely uncovered by the iron core element. In each angle position, at least one of the transmitter coils is covered at least partially by the iron core element. Basically, as a function of the angle to be measured, i.e., of the angle position or angle position of the iron core element, the sectors of the transmitter coils are each covered by the iron core element with a portion between 0% and 100% of each sector. Due to the sector-shaped iron core element, the covered portions of the sectors of the transmitter coils likewise have a sector shape. Thus, the specified portion represents the ratio of the central angle of the sector-shaped coverage of the sector of the respective transmitter coil to the central angle of the sector of the respective transmitter coil.

The coils and the iron core element can be considered components of an angle sensor. In this respect, the method according to the invention also represents a method for operating an angle sensor.

The method according to the invention first comprises a step in which electrical primary voltage pulses are applied to the individual transmitter coils. The primary voltage pulses each induce a secondary voltage pulse in at least one of the other coils. The secondary voltage pulses can each be allocated to one of the primary voltage pulses and thus also to the transmitter coil charged by this primary voltage pulse. The amplitudes of the secondary voltage pulses are each dependent on the percentage of coverage of the sector of the respectively allocated transmitter coil by the iron core element. If the sector of the respectively allocated transmitter coil is completely covered by the iron core element, this leads to a high amplitude of the secondary voltage pulse. In contrast, if the sector of the respectively allocated transmitter coil is completely uncovered by the iron core element, this leads to a small amplitude of the secondary voltage pulse.

According to the invention, two steps are performed for completely determining the angle to be measured. In a first of these two steps, the transmitter coil whose sector is covered only partially by the iron core element is selected. This selection is done based on a comparison of the amplitudes of the secondary voltage pulses. Using the amplitude of the secondary voltage pulse that is allocated to the selected transmitter coil, the exact determination of the angle to be measured takes place in a second of the mentioned steps. Determining the angle to be measured takes place starting from a ratio calculation between the amplitude of the secondary voltage pulse allocated to the selected transmitter coil to an amplitude maximum. In addition, a reference is made to the sector of the selected transmitter coil, so that an absolute reference to the angle position between the first machine element and the second machine element is possible. By calculating the ratio between the amplitude of the secondary voltage pulse allocated to the selected transmitter coil to an amplitude maximum, ultimately the percentage of coverage of the sector of the selected transmitter coil is determined. This percentage is dependent on the angle to be measured. Because the angle position of the sector of the selected transmitter coil is known, the angle to be measured can thus be determined.

A particular advantage of the method according to the invention consists in that, through the number of at least five transmitter coils and through the selection of each transmitter coil with a sector covered only partially by the iron core element, the determination of the angle to be measured takes place based on a transmitter coil that is covered or uncovered not only in an edge area of the iron core element. Through this exclusion of the edge areas of the transmitter coils, the determination of the angle to be measured takes place on the basis of induced secondary voltage pulses that are caused by a magnetic field in the middle part of the transmitter coil, wherein the magnetic field has a homogeneous construction as much as possible. This leads to high accuracy in determining the angle to be measured.

Preferably, the sector of the selected coil is covered by the iron core element by at least a quarter with respect to its central angle. Furthermore, the sector of the selected coil is preferably covered by the iron core element by up to three quarters with respect to its central angle. Thus, preferably only the middle half of the sector with respect to its central angle is used for determining the angle to be measured.

In preferred embodiments of the method according to the invention, the selection of the transmitter coil with a sector covered only partially by the iron core element comprises the following sub-steps: In a first sub-step, an average value is formed from two amplitudes. The first amplitude of the average value to be formed is the amplitude of the secondary voltage pulse that is allocated to the transmitter coil whose sector is covered completely by the iron core element. The second amplitude of the average value to be formed is the amplitude of the secondary voltage pulse that is allocated to the transmitter coil whose sector is completely uncovered by the iron core element. In another sub-step, the transmitter coil with a sector that is only partially covered by the iron core element is selected, wherein the allocated secondary voltage pulse of this sector has the amplitude that comes closest to the average value. This guarantees that the selected transmitter coil comes closest to equal coverage by the iron core element.

In another preferred embodiment of the method according to the invention, the selection of one of the transmitter coils with a sector covered only partially by the iron core element comprises the following sub-steps: In a first sub-step, each of the transmitter coils with a sector covered only partially by the iron core element is allocated a difference. Each of these differences is formed by minuend and a subtrahend. The minuends of these differences are each formed by an average value of two amplitudes. The first amplitude of these two amplitudes is the amplitude of the secondary voltage pulse that is allocated to the transmitter coil closest to the respective transmitter coil with a sensor covered completely by the iron core element. This is preferably the transmitter coil with a sensor covered completely by the iron core element that is directly adjacent to the respective transmitter coil. The second of the two amplitudes of the average value to be formed is the amplitude of the secondary voltage pulse that is allocated to the transmitter coil closest to the respective transmitter coil with a sector uncovered completely by the iron core element. Preferably, this is the transmitter coil with a sector uncovered completely by the iron core element that is directly adjacent to the respective transmitter coil. The subtrahends of the differences are each formed by the amplitude of the secondary voltage pulse allocated to the respective transmitter coil. In another sub-step, the transmitter coil with a sensor covered only partially by the iron core element is selected that is allocated to the difference with the smallest absolute value. This guarantees that the selected transmitter coil comes closest to equal coverage by the iron core element.

The sectors of the transmitter coils preferably have identical central angles. Also, the sectors of the transmitter coils are preferably the same size. Preferably, the sectors of the transmitter coils are distributed equally about the rotational axis.

The sectors of the transmitter coils are preferably formed by circular ring sectors about the rotational axis. The area close to the rotational axis can be used, for example, for guiding through a shaft, about which the circular ring-shaped sectors are arranged.

The circular-ring sectors of the transmitter coils are preferably arranged coaxial to the rotational axis. The sectors of the transmitter coils are preferably arranged about the rotational axis directly adjacent to each other in pairs.

Preferably, five of the transmitter coils are used, whose sectors each have a central angle between 62° and 72°; especially preferred between 67° and 72°. The ideal central angle of 72° cannot always be achieved technically due to the arrangement of the windings of the transmitter coils.

The use of more than five transmitter coils can increase the accuracy of the angle measurement.

The transmitter coils preferably lie together in one plane that is arranged perpendicular to the rotational axis and is axially adjacent to the iron core element. In addition, the transmitter coils are preferably formed as two-dimensional shapes, in particular, as strip conductors on a printed circuit board.

In an especially preferred way, the coils also comprise a receiver coil that completely surrounds the rotational axis and is always opposite the iron core element while the second machine element rotates relative to the first machine element. In this way, the secondary voltage pulses are induced in the receiver coil.

The receiver coil is preferably circular and formed coaxial to the rotational axis. The receiver coil is also preferably formed with a two-dimensional shape, in particular, by strip conductors on the same printed circuit board as the transmitter coils. The receiver coil could also be formed by several electrically connected individual coils.

Alternatively, the use of a receiver coil can be eliminated. In this case, the secondary voltage pulses are induced in the transmitter coils.

In a preferred embodiment of the method according to the invention, the individual transmitter coils are loaded one after the other in time with the individual primary voltage pulses. The primary voltage pulses must be long enough in time so that equal currents are formed in the transmitter coils. The falling edges of the primary voltage pulses must be steep enough to not affect the settling of the transmitter coils.

The primary voltage pulses preferably have a trapezoidal signal shape. More preferably, the primary voltage pulses have a rectangular signal shape.

For simple embodiments of the method according to the invention, the amplitude maximum is formed by the greatest of the amplitudes of the secondary voltage pulses.

Preferably, the amplitude maximum is formed by the amplitude of the secondary voltage pulse that is allocated to the transmitter coil that is closest to the selected transmitter coil and whose sector is covered completely by the iron core element.

In an especially preferred manner, the amplitude maximum is formed by the amplitude of the secondary voltage pulse that is allocated to the transmitter coil that is closest to the selected transmitter coil and whose sector is covered completely by the iron core element, wherein the amplitude of the secondary voltage pulse is subtracted that is allocated to the transmitter coil that is closest to the selected transmitter coil and whose sector is uncovered completely by the iron core element.

The iron core element is preferably opposite the transmitter coils in a circular sector. Alternatively, the area around the rotational axis could be cut out, so that the iron core element is opposite the transmitter coils in a circular ring sector.

The iron core element is preferably formed as a circular sector or as a circular ring sector. Because the iron core element also has a height or an axial width, it is formed as a flat circular sector cylinder or a flat circular ring sector cylinder accordingly.

The sector of the iron core element is preferably arranged perpendicular to the rotational axis.

The sector of the iron core element has a central angle of preferably between 90° and 270°. This guarantees that at least one of the sectors of the transmitter coils is completely covered by the iron core element and one of the sectors is completely uncovered by the iron core element.

In an especially preferred way, the sector of the iron core element has a central angle of 180°. Consequently, the iron core element is formed by a semicircle or by a flat half cylinder. For alternative embodiments, the sector of the iron core element has a central angle of 150° or 220°, in particular, in combination with six transmitter coils.

The iron core element is characterized in that it is ferromagnetic. Preferably, the iron core element is made from a soft-magnetic material. In an especially preferred way, the iron core element is formed through the use of an injection molding mold, in which soft-magnetic ferrite powder is injected.

The secondary voltage pulses are preferably guided directly to A/D converters, so that the ratio formation between the amplitude of the secondary voltage pulse allocated to the selected transmitter coil to the amplitude maximum is realized on a digital signal level.

The angle sensor according to the invention is used to measure an angle between a first machine element and a second machine element that can rotate about a rotational axis relative to the first machine element. The angle sensor at first comprises several coils locked in rotation with the first machine element. The coils comprise at least five transmitter coils that are each distributed in a sector about the rotational axis. The angle sensor further comprises an iron core element that is locked in rotation with the second machine element and is opposite the transmitter coils in the form of a sector about the rotational axis. Therefore, as a function of the angle to be measured, the sectors of the transmitter coils are each covered with a percentage between 0% and 100% of the respective sector by the iron core element. Another component of the angle sensor is the measurement electronics that are designed for performing the steps of the method according to the invention.

Preferred embodiments of the angle sensor according to the invention also include those features that are indicated for components used in the method according to the invention and for preferred embodiments of the method according to the invention. The measurement electronics of the angle sensor according to the invention are preferably also designed for performing those steps as indicated for preferred embodiments of the method according to the invention.

The measurement electronics preferably include a microprocessor that are connected to each transmitter coil via a power-electronic switching element, in particular, via a transistor.

The coils are preferably connected rigidly to each other, for example, they are mounted on a printed circuit board or are formed together on the printed circuit board.

The coil preferably also comprise a receiver coil. The microprocessor preferably has an integrated A/D converter that is connected directly to the receiver coil, i.e., without voltage conversion.

The angle sensor according to the invention is preferably formed on or in a component of a motor vehicle. In an especially preferred way, the angle sensor according to the invention is formed on a valve of a motor vehicle, so that, with the help of the angle sensor, the position of the valve can be measured. In an especially preferred way, the angle sensor according to the invention is formed on a valve of a coolant line of a motor vehicle.

BRIEF DESCRIPTION OF THE DRAWINGS

Additional advantages, details, and refinements of the invention are given from the following description of preferred embodiments of the angle sensor according to the invention, with reference to the drawing. Shown are.

DETAILED DESCRIPTION OF THE PREFERRED EMBODIMENTS

Figure 1:
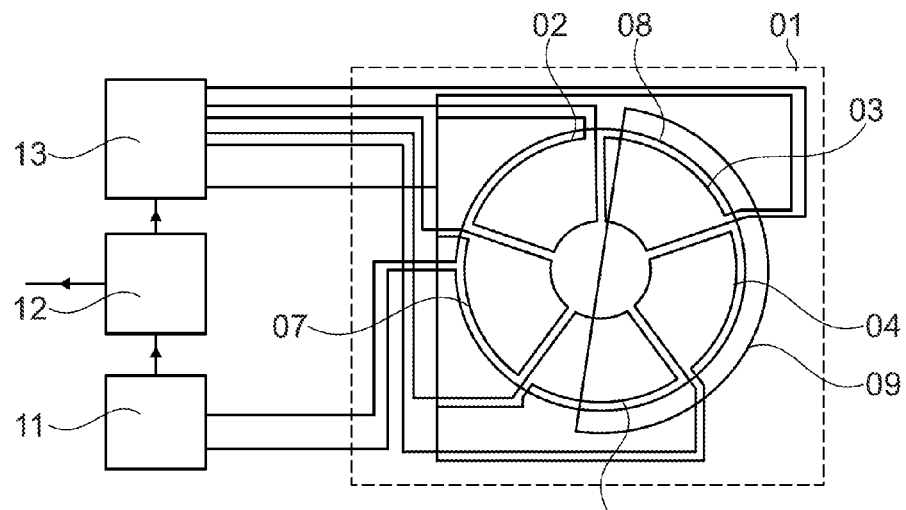
FIG. 1: a basic diagram of an angle sensor according to the invention.

FIG. 1 shows a basic diagram of a preferred embodiment of an angle sensor according to the invention. The angle sensor first comprises a printed circuit board 01 on which five transmitter coils 02, 03, 04, 06, 07 are formed by strip conductors. The five transmitter coils 02, 03, 04, 06, 07 are each formed as circular ring sectors and together form a circular ring. On the printed circuit board 01 there is also a receiver coil 08 in the form of strip conductors that circumferentially surround all of the five transmitter coils 02, 03, 04, 06, 07. The printed circuit board 01 with the five transmitter coils 02, 03, 04, 06, 07 located on it and the receiver coil 08 located on it is mounted on a first machine element (not shown). A second machine element (not shown) that can rotate relative to the first machine element has an iron core element 09 that is arranged in the rotational axis and rotates together with the second machine element about the first machine element and the printed circuit board 01. The iron core element 09 consists of a soft-magnetic material and has, in cross section, a semicircular shape, so that it is formed as a flat half cylinder. The rotational axis of the second machine element is located at the center of the entirety of the five transmitter coils 02, 03, 04, 06, 07. The center of the semicircular shape of the iron core element 09 is also located in the rotational axis. The iron core element 09 is axially adjacent to the printed circuit board 01 so that it is opposite a part of the receiver coil 08 and some of the five transmitter coils 02, 03, 04, 06, 07 as a function of the angle to be measured.

An A/D converter 11, a control unit 12, and a drive amplifier 13 form measurement electronics that are connected electrically to the five transmitter coils 02, 03, 04, 06, 07 and to the receiver coil 08 and are arranged at a distance from these parts. The receiver coil 08 is connected electrically to the A/D converter 11. The signal digitized by the A/D converter 11 is fed to the control unit 12. With the help of the control unit 12, primary voltage pulses are generated that are amplified by the drive amplifier 13 and fed to the five transmitter coils 02, 03, 04, 06, 07. In the evaluation of the secondary voltage pulses induced in the receiver coil 08, the value for the angle between the first machine element and the second machine element is determined and output via the control unit 12.

Figure 2:
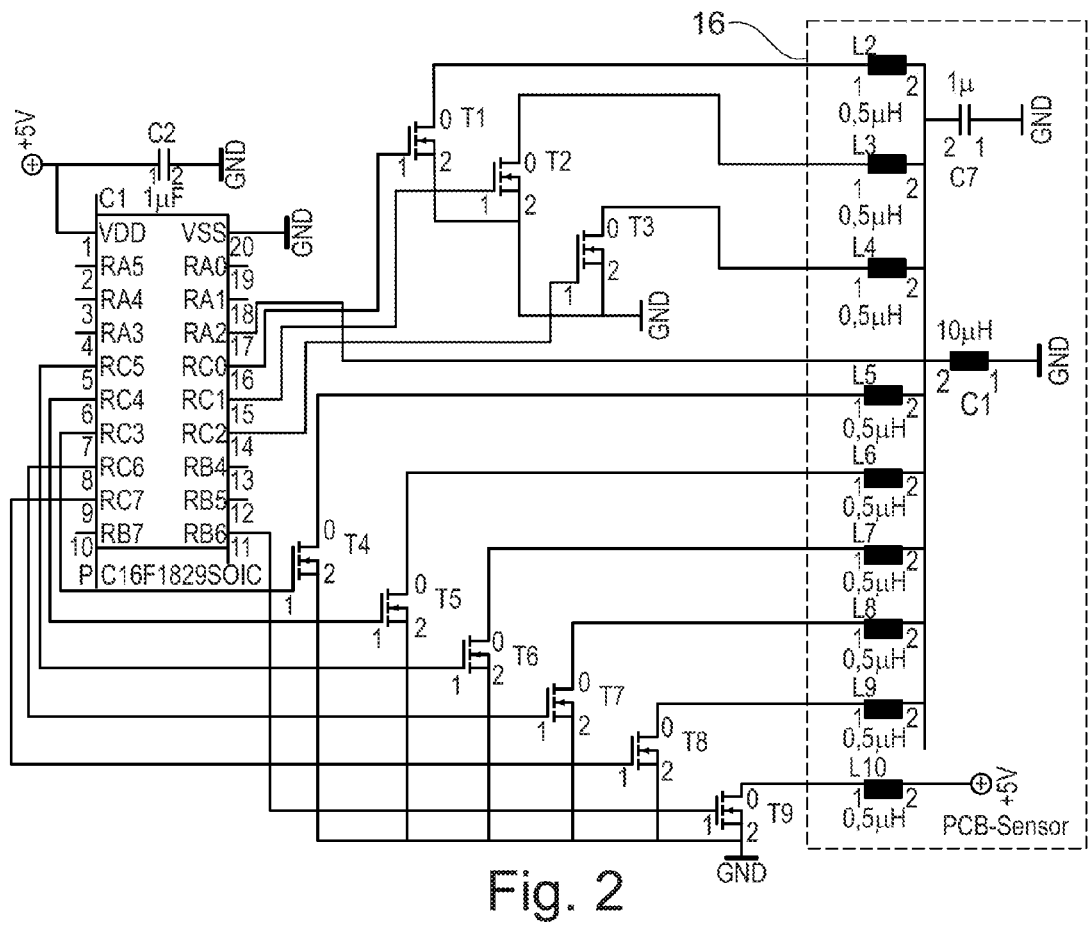
FIG. 2: a circuit diagram of another preferred embodiment of the angle sensor according to the invention.

FIG. 2 shows a circuit diagram of another preferred embodiment of the angle sensor according to the invention. On a printed circuit board 16 there is a receiver coil L1 and nine transmitter coils L2, L3, L4, L5, L6, L7, L8, L9, L10. Measurement electronics comprise an integrated circuit IC1 through which primary voltage pulses are output that are amplified by transistors T1, T2, T3, T4, T5, T6, T7, T8, T9 in order to charge the transmitter coils L2, L3, L4, L5, L6, L7, L8, L9, L10. The integrated circuit IC1 comprises an A/D converter that is connected directly to the receiver coil L1.

LIST OF REFERENCE NUMBERS

01 Printed circuit board
02 Transmitter coil
03 Transmitter coil
04 Transmitter coil
05 -
06 Transmitter coil
07 Transmitter coil
08 Receiver coil
09 Iron core element
10 -
11 A/D converter
12 Control unit
13 Drive amplifier
14 -
15 -
16 Printed circuit board

The invention claimed is:

1. A method for measuring an angle between a first machine element and a second machine element that rotates around a rotational axis relative to the first machine element, wherein:

a plurality of coils are locked in rotation with the first machine element, the plurality of coils comprise at least five transmitter coils that are distributed around the rotational axis and are each arranged in sectors around the rotational axis, an iron core element is locked in rotation with the second machine element, the iron core element having the form of a sector around the rotational axis and being arranged opposite the at least five transmitter coils, such that as a function of the angle to be measured, the sectors of the at least five transmitter coils are each covered with a percentage between 0% and 100% of the sector of the iron core element, the method comprising:

loading the at least five transmitter coils individually with primary voltage pulses, wherein through the primary voltage pulses, a secondary voltage pulse is induced in at least one of the at least five transmitter coils, allocating the secondary voltage pulses to one of the at least five transmitter coils and wherein amplitudes of the secondary voltage pulses are each dependent on a percentage of coverage of a sector of the respectively allocated transmitter coils by the iron core element, and selecting one of the at least five transmitter coils with the sector thereof covered only partially by the iron core element starting from a comparison of the amplitudes of the secondary voltage pulses, and determining the angle to be measured starting from a ratio formation between the amplitude of the secondary voltage pulse allocated to the selected transmitter coil to an amplitude maximum and by a reference to the sector of the selected transmitter coil.

2. The method according to claim 1, wherein the sector of the selected transmitter coil is covered by the iron core element at least up to one quarter and up to three quarters with respect to a central angle thereof.

3. The method according to claim 1, wherein the selection of one of the at least five transmitter coils with a sector covered only partially by the iron core element comprises the following sub-steps:

allocating a difference to each of the at least five transmitter coils with the sector thereof covered only partially by the iron core element, forming minuends of differences by an average value of the amplitude of the secondary voltage pulse that is allocated to a transmitter coil closest to the respective transmitter coil with the sector thereof covered completely by the iron core element and the amplitude of the secondary voltage pulse that is allocated to a transmitter coil adjacent to the respective transmitter coil with the sector thereof uncovered completely by the iron core element, and forming subtrahends by the amplitude of the secondary voltage pulse allocated to the respective transmitter coil, and selecting the transmitter coil with the sector thereof that is covered only partially by the iron core element and is allocated to a difference with a smallest absolute value.

4. The method according to claim 1, wherein the sectors of the at least five transmitter coils have an equal central angle and are distributed equally around the rotational axis.

5. The method according to claim 1, wherein the at least five transmitter coils further comprise a receiver coil that completely surrounds the rotational axis and is opposite the iron core element for rotation of the second machine element relative to the first machine element, and the secondary voltage pulses are induced in the receiver coil.

6. The method according to claim 1, further comprising loading the at least five transmitter coils individually and sequentially one after the other with the individual primary voltage pulses.

7. The method according to claim 1, further comprising forming an amplitude maximum by the amplitude of the secondary voltage pulse that is allocated to the transmitter coil that is adjacent to the selected transmitter coil and the sector of which is covered completely by the iron core element.

8. The method according to claim 1, further comprising forming an amplitude maximum by the amplitude of the secondary voltage pulse that is allocated to the transmitter coil that is adjacent to the selected transmitter coil and the sector of which is covered completely by the iron core element, and subtracting the amplitude of the secondary voltage pulse that is allocated to the transmitter coil that is adjacent to the selected transmitter coil and the sector of which is uncovered completely by the iron core element.

9. The method according to claim 1, the sector of the iron core element has a central angle of 180°.

10. An angle sensor for measuring an angle between a first machine element and a second machine element that rotates around a rotational axis relative to the first machine element, comprising the following components:
- transmitter coils locked in rotation with the first machine element, the transmitter coils comprise at least five transmitter coils that are each distributed in sectors around the rotational axis,
- an iron core element that is locked in rotation with the second machine element, the iron core element having the form of a sector around the rotational axis and being arranged opposite the transmitter coils, wherein, as a function of the angle to be measured, the sectors of the transmitter coils are each covered with a percentage between 0% and 100% of the respective sector by the iron core element, and
- measurement electronics configured to (a) load the transmitter coils individually with primary voltage pulses, wherein through the primary voltage pulses, a secondary voltage pulse is induced in at least one of the at least five transmitter coils, (b) allocate the secondary voltage pulses to one of the transmitter coils and wherein amplitudes of the secondary voltage pulses are each dependent on a percentage of coverage of a sector of the respectively allocated transmitter coils by the iron core element, (c) select one of the transmitter coils with the sector thereof covered only partially by the iron core element starting from a comparison of the amplitudes of the secondary voltage pulses, and (d) determine the angle to be measured starting from a ratio formation between the amplitude of the secondary voltage pulse allocated to the selected transmitter coil to an amplitude maximum and by a reference to the sector of the selected transmitter coil.

11. The angle sensor according to claim 10, wherein the angle sensor is for a thermal management module.

* * * * *